United States Patent Office 2,877,247
Patented Mar. 10, 1959

2,877,247

METHOD FOR PREPARING ANHYDRIDES OF HIGH MOLECULAR WEIGHT LONG-CHAIN FATTY ACIDS

Joseph Nichols, Princeton, and Edgar S. Schipper, New Brunswick, N. J., assignors to Ethicon, Inc., a corporation of New Jersey No Drawing. Application May 5, 1955
Serial No. 506,358

2 Claims. (Cl. 260—413)

This invention relates to anhydrides of high molecular weight long-chain fatty acids and particularly relates to anhydrides of fatty acids having at least twelve carbon atoms and a method for their preparation.

Geometrically isomeric ricinoleic acid and ricinelaidic acid, having the structural formula:

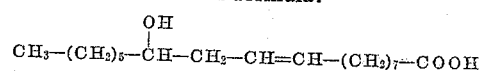

may be oxidized with chromic acid or with an aluminum secondary or tertiary alkoxide to provide geometrically isomeric 12-ketooleic acid and 12-ketoelaidic acid having the structural formula:

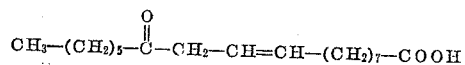

U. S. Patent No. 2,623,888, December 30, 1952, discloses the preparation of 12-keto-10,11-octadecenoic acid by the isomerization of 12-ketooleic acid or 12-ketoelaidic acid. 12-keto-10,11-epoxystearic acid and 12-keto-10,11-dihydroxystearic acid may be prepared by the oxidation of 12-keto-10,11-octadecenoic acid with hydrogen peroxide. Oxidation with hydrogen peroxide leading to the production of 12-keto-10,11-epoxystearic acid is conducted in an alkaline medium at a low temperature and is preferably conducted at a temperature not above —5° C. in the presence of magnesium chloride, which acts as a catalyst. Oxidation with hydrogen peroxide leading to the production of 10,11-dihydroxy-12-ketostearic acid is conducted in solution in anhydrous tertiary butyl alcohol or in solution in anhydrous ether in the presence of a catalytic amount of osmium tetroxide, and preferably at a temperature not exceeding 50° C.

U. S. Patent No. 2,623,889, December 30, 1952, discloses the oxidation of 12-ketooleic acid and 12-ketoelaidic acid and esters of the acids with chromic acid to produce a diketo-octadecenoic acid, having an empirical formula of $C_{18}H_{30}O_4$ and a melting point of 112° C. to 113° C. The oxidation was carried out by means of excess chromic acid over that required to oxidize a methylene group in the molecule, approximately 400 percent excess being preferred for the best yields. The solvent medium was glacial acetic acid in an amount in excess of that required for a single phase reaction medium and excess free sulfuric acid was also present in an amount of at least about three times as much as required to form chromic acid from the soluble dichromate present in the reaction mixture. It was originally believed that the carbon-carbon double bond in the diketo-octadecenoic acid prepared by the oxidation was in the 9,10 position, but it has been since shown that the position of the carbon double bond is 10,11.

9,12-diketo-10,11-epoxystearic acid and 9,12-diketo-10,11-dihydroxystearic acid may be prepared by the oxidation of 9,12-diketo-10,11-octadecenoic acid with hydrogen peroxide. Oxidation with hydrogen peroxide leading to the production of 9,12-diketo-10,11-epoxystearic acid is conducted in an alkaline medium at a low temperature and is preferably conducted at a temperature not above —5° C. in the presence of magnesium chloride which acts as a catalyst. Oxidation with hydrogen peroxide leading to the production of 9,12-diketo-10,11-dihydroxystearic acid is conducted in a neutral or slightly acidic medium and preferably at a temperature not exceeding 70° C. in the presence of a catalytic amount of osmium tetroxide.

The novel fatty acid anhydrides of this invention may be prepared by reacting substantially equi-molar amounts of the acid and a lower alkyl chloroformate such as isobutylchloroformate, ethylchloroformate, or propylchloroformate in the presence of a substantially equi-molar amount of a lower aliphatic tertiary amine, an acylalkyl-carbonate being the result of the reaction. The reaction is conducted at a temperature below about 0° C. and in the presence of an inert solvent such as tetrahydrofuran or toluene. The addition of a tertiary amine salt of a high molecular weight long-chain fatty acid, and preferably a tertiary amine salt of an acid having at least twelve carbon atoms, to the reaction mixture containing the acylalkylcarbonate results in the formation of the desired anhydride.

A low molecular weight aliphatic alcohol is formed during the reaction and may interfere with the isolation of the desired acid anhydride because of its tendency to react with the acid anhydride to form a low molecular weight aliphatic ester of the acid. Acid anhydrides which may be isolated by fractionational crystallization are obtained in good yields; however, when the acid anhydrides are non-crystalline and distillation is necessary to separate and purify the acid anhydride, there is some formation of low molecular weight aliphatic esters of the acid and this is probably due to the effect of heat in furthering the reaction between the low molecular weight aliphatic alcohol and the acid anhydride. The best yields are obtained when the acid anhydrides formed are crystalline above room temperature or slightly below room temperature.

Although the process of this invention is applicable generally to the preparation of anhydrides of high molecular weight long-chain fatty acid, and particularly to the preparation of anhydrides of fatty acids having at least twelve carbon atoms, it is illustrated in the examples below for use in the preparation of a series of novel acid anhydrides, said anhydrides having the following general structure:

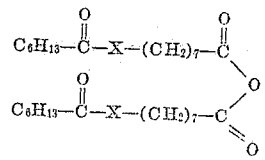

in which X is a 1,2-epoxypropylene, vinylmethylene, ethylenecarbonyl, vinylenecarbonyl, epoxyethylenecarbonyl or methylenevinyl radical, the said radicals being the same or different and having the following structural formulae respectively:

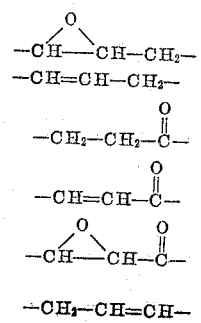

For the purpose of illustration, the following examples are set forth to illustrate the preparation of the novel compounds of the invention but are not to be construed as limiting the spirit of the invention or its scope.

EXAMPLE I

12-keto-10,11-epoxystearic acid anhydride 4.11 grams of isobutylchloroformate were added dropwise to a stirred solution of 9.36 grams of 12-keto-10,11-epoxystearic acid and 3.06 grams of triethylamine in 300 ml. of dry toluene, the temperature during the addition being maintained at −5° C. to −10° C. The reaction mixture was maintained at a temperature of −5° C. to −10° C. after addition was complete and stirred for thirty minutes. A solution of 9.36 grams of 12-keto-10,11-epoxystearic acid and 3.06 grams of triethylamine in 300 ml. of dry toluene was added and the suspension was refluxed for thirty minutes. The triethylamine hydrochloride which precipitated during the reaction was removed by filtration and the filtrate was evaporated to dryness under reduced pressure. The residue was washed with a ten percent potassium carbonate solution and then washed three times with water. The product was dried and recrystallized three times from ether. 18.1 grams of 12-keto-10,11-epoxystearic acid anhydride having a melting point of 71° C. were obtained.

Calculated for $C_{36}H_{62}O_7$: Carbon=71.28%; hydrogen=10.23%. Found: Carbon = 71.54%; hydrogen=10.14%.

EXAMPLE II

12-ketooleic acid anhydride 4.11 grams of isobutylchloroformate were added dropwise to a stirred solution of 8.88 grams of 12-ketooleic acid and 3.06 grams of triethylamine in 300 ml. of dry toluene, the temperature during the addition being maintained at −5° C. to −10° C. The reaction mixture was maintained at a temperaure of −5° to −10° C. after addition was complete and stirred for thirty minutes. A solution of 8.8 grams of 12-ketooleic acid and 3.06 grams of triethylamine in 300 ml. of dry toluene was added and the suspension was refluxed for thirty minutes. The triethylamine hydrochloride which precipitated during the reaction was removed by filtration and the filtrate was evaporated to dryness under reduced pressure. The residue was washed with a ten percent potassium carbonate solution and washed three times with water. The product was dried and recrystallized three times from petroleum ether (boiling point 30°–60° C.). 5.2 grams of 12-ketooleic acid anhydride having a melting point of 51° C. were obtained.

Caluculated for $C_{36}H_{62}O_5$: Carbon=75.21%; hydrogen=10.87%. Found. Carbon = 75.34%; hydrogen=11.05%.

EXAMPLE III

12-ketoelaidic acid anhydride 4.11 grams of isobutylchloroformate were added dropwise to a stirred solution of 8.88 grams of ketoelaidic acid and 3.06 grams of triethylamine in 300 ml. of tetrahydrofuran, the temperature during the addition being maintained at −5° to −10° C. The reaction mixture was maintained at a temperature of −5° to −10° C. after addition was complete and stirred for thirty minutes. A solution of 8.88 grams of 12-ketoelaidic acid and 3.06 grams of triethylamine in 300 ml. of tetrahydrofuran was added and the suspension was refluxed for thirty minutes. The triethylamine hydrochloride which precipitated during the reaction was removed by filtration and the filtrate was evaporated to dryness under reduced pressure. The residue was washed with a ten percent potassium carbonate solution and then washed three times with water. The product was dried and recrystallized three times from ether. 12.2 grams of 12-ketoelaidic acid anhydride having a melting point of 76° C. were obtained.

Calculated for $C_{36}H_{62}O_5$: Carbon=75.21%; hydrogen = 10.87%. Found: Carbon = 74.95%; hydrogen=11.00%.

EXAMPLE IV

9,12-diketostearic acid anhydride 4.11 grams of isobutylchloroformate were added dropwise to a stirred solution of 9.36 grams of 9,12-diketostearic acid and 3.06 grams of triethylamine in 300 ml. of tetrahydrofuran, the temperature during the addition being maintained at −5° C. to −10° C. The reaction mixture was maintained at a temperature of −5° to −10° C. after addition was complete and stirred for thirty minutes. A solution of 9.36 grams of 9,12-diketostearic acid and 3.06 grams of triethylamine in 300 ml. of tetrahydrofuran was added and the suspension was refluxed for thirty minutes. The triethylamine hydrochloride which precipitated during the reaction was removed by filtration and the filtrate was evaporated to dryness under reduced pressure. The residue was washed with a ten percent potassium carbonate solution and then washed three times with water. The product was dried and recrystallized three times from ethyl acetate. 17.5 grams of 9,12-diketostearic acid anhydride having a melting point of 105° C. were obtained.

Calculated for $C_{36}H_{62}O_7$: Carbon=71.28%; hydrogen = 10.23%. Found: Carbon = 71.16%; hydrogen=10.09%.

EXAMPLE V

9,12-diketo-10,11-epoxystearic acid anhydride 4.11 grams of isobutylchloroformate were added dropwise to a stirred solution of 9.78 grams of 9,12-diketo-10,11-epoxystearic acid and 3.06 grams of triethylamine in 800 ml. of methylene chloride, the temperature during the addition being maintained at −5° C. to −10° C. The reaction mixture was maintained at a temperature of −5° C. to −10 C. after addition was complete and stirred for thirty minutes. A solution of 9.78 grams of 9,12-diketo-10,11-epoxystearic acid and 3.06 grams of triethylamine in 800 ml. of methylene chloride was added and the suspension was refluxed for thirty minutes. The triethylamine hydrochloride was removed by filtration and the filtrate was evaporated to dryness under reduced pressure. The residue was washed with a ten percent potassium carbonate solution and then washed three times with water. The product was dried and recrystallized three times from ethyl acetate. 18.7 grams of 9,12-diketo-10,11-epoxystearic acid anhydride having a melting point of 103° C. were obtained.

Calculated for $C_{36}H_{58}O_9$: Carbon=68.11%; hydrogen = 9.21%. Found: Carbon = 68.00%; hydrogen=9.43%.

EXAMPLE VI

12-keto-10,11-octadecenoic acid anhydride 4.11 grams of isobutylchloroformate were added dropwise to a stirred solution of 8.88 grams of 12-keto-10,11-octadecenoic acid and 3.06 grams of triethylamine in 300 ml. of dry toluene, the temperature during the addition being maintained at −5° C. to −10° C. The reaction mixture was maintained at a temperature of −5° C. to −10° C. and stirred for thirty minutes. A solution of 8.88 grams of 12-keto-10,11-octadecenoic acid and 3.06 grams of triethylamine in 300 ml. of dry toluene was added and the suspension was refluxed for thirty minutes. The triethylamine hydrochloride which precipitated during the refluxing period was removed by filtration and the filtrate was evaporated to dryness under reduced pressure. The residue was washed with a ten percent potassium carbonate solution and then washed three times with water. The product was dried and recrystallized several times from petroleum ether (B. P. 30°–60°

C.) the precipitate being formed at 0° C. 15.2 grams of 12-keto-10,11-octadecenoic acid anhydride having a melting point of 53° C. were obtained.

Calculated for $C_{36}H_{62}O_5$: Carbon=75.21%; hydrogen=10.87%. Found: Carbon=75.31%; hydrogen=10.73%.

EXAMPLE VII

9,12-diketo-10,11-octadecenoic acid anhydride 4.11 grams of isobutylchloroformate were added dropwise to a stirred solution of 9.3 grams of 9,12-diketo-10,11-octadecenoic acid and 3.06 grams of triethylamine in 300 ml. of tetrahydrofuran, the temperature during the addition being maintained at −5° C. to −10° C. The reaction mixture was maintained at −5° to −10° and stirred for thirty minutes. A solution of 9.3 grams of 9,12-diketo-10,11-octadecenoic acid and 3.06 grams of triethylamine in 300 ml. of dry toluene was added and the suspension was refluxed for thirty minutes. The triethylamine hydrochloride which precipitated during the reaction was removed by filtration and the filtrate was evaporated to dryness under reduced pressure. The residue was washed with a ten percent potassium carbonate solution and then washed three times with water. The product was dried and recrystallized three times from ethyl acetate. 15.9 grams of 9,12-diketo-10,11-octadecenoic acid anhydride having a melting point of 108° C. were obtained.

Calculated for $C_{36}H_{58}O_7$: Carbon=71.72%; hydrogen=9.70%. Found: Carbon=72.06%; hydrogen=9.72%.

EXAMPLE VIII

Linoleic acid anhydride 4.11 grams of isobutychloroformate were added dropwise to a stirred solution of 8.41 grams of linoleic acid and 3.06 grams of triethylamine in 300 ml. of dry toluene, the temperature during the additionn being maintained at −5° to −10° C. After addition was complete, the reaction mixture was maintained at a temperature of −5° to −10° C. and stirred for thirty minutes. A solution of 8.41 grams of linoleic acid and 3.06 grams of triethylamine in 300 ml. of dry toluene was added and the suspension which was formed was refluxed for 30 minutes. The triethylamine hydrochloride which precipitated during the refluxing period was removed by filtration and the filtrate was evaporated to dryness under reduced pressure. The residue was washed with ten percent aqueous carbonate solution and then three times with water. The washed material was dried and recrystallized three times from petroleum ether (30°–60° C.), the precipitate being formed at −20° C. 11.1 grams of linoleic acid anhydride having a melting point of −3° C. to −1° C. were obtained.

EXAMPLE IX

Oleic acid anhydride 4.11 grams of isobutylchloroformate were added dropwise to a stirred solution of 8.47 grams of oleic acid and 3.06 grams of triethylamine in 300 ml. of dry toluene, the temperature during the addition being maintained at −5° C. to −10° C. After addition was complete the reaction mixture was maintained at a temperature of −5° C. to −10° C. and stirred for thirty minutes. A solution of 8.47 grams of oleic acid and 3.06 grams of triethylamine in 300 ml. of dry toluene was added and the suspension which formed was refluxed for thirty minutes. The triethylamine hydrochloride which precipitated during the refluxing period was removed by filtration and the filtrate was evaporated to dryness under reduced pressure. The residue was washed with ten percent potassium carbonate solution and then three times with water. The washed material was dried and recrystallized three times from petroleum ether (B. P. 30°–60° C.), the precipitate being formed at −20° C. 14.9 grams of oleic acid anhydride having a melting point of 22° C. were obtained.

The novel compounds of this invention are highly effective at low concentration in killing microorganisms or preventing or inhibiting their growth.

EXAMPLE X

The compounds prepared according to the above examples were tested for bactericidal activity by the following serial dilution method.

The compounds were sterilized by exposure to propylene oxide for three days and 0.5 milliliter of sterile aqueous solution containing twenty micrograms of compound per milliliter of solution was added to 9.5 milliliters of sterile yeast beef broth, the broth then being serially diluted with additional sterile broth to provide solutions of five milliliters total volume containing 500, 200, 100, 50, 10, 1, 0.1, and 0.01 micrograms of compound per milliliter of solution. Three tubes, each containing 4.5 milliliters of sterile broth, were inoculated with 0.1 milliliter of a mature broth culture of *Bacillus subtilis*, *Diplococcus pneumoniae* III, and *Micrococcus pyogenes* var. *aureus*, respectively, and the inoculated tubes were incubated at 37° C. for 24 hours. Three tubes, each containing 4.5 milliliters of sterile broth were each inoculated with 0.1 milliliter of an incubated culture and incubated at 37° C. for 24 hours. Progressive series of dilutions ranging from 1 to 100, to 1 to 1 billion, were prepared by dilution of the contents of the three tubes witih sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organisms were each transferred into each of the tubes containing the compounds to be tested and this was followed by incubation of the tubes at 37° C. for 48 hours. The table below gives the results of the tests by serial dilution in column I, the values being the concentrations in micrograms per milliliter at which growth was inhibited.

The compounds prepared according to the foregoing examples were tested for activity against *Mycobacteria tuberculosis* H37Rv according to the method of A. W. Frisch and M. S. Tarshis, American Review of Tuberculosis, vol. 64, page 551 (1951). The table below gives the results of the activity of the novel compounds against *Mycobacteria tuberculosis* H37Rv in column II, inhibiting concentrations being expressed in micrograms per milliliter.

The compounds prepared according to the foregoing examples were tested for activity against *Coccidioides immitis* by a serial dilution method given by the following procedure:

The compounds to be tested were sterilized by exposure to propylene oxide for three days and 0.25 milliliter of sterile aqueous solution containing twenty micrograms of compound per milliliter of solution was added to 4.5 milliliters of sterile Mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Coccidioides immitis* was added to ninety-nine milliliters of sterile Mycophil broth and 0.2 milliliter of diluted culture was added to each of the serial dilutions containing the test compound and the inoculated tubes were incubated at 25° C. for five days. The table below gives the results of the tests in column III, inhibiting concentrations being expressed in micrograms per milliliter:

TABLE

|  | Column I | | | Column II | Column III |
| --- | --- | --- | --- | --- | --- |
|  | Bacterial Inhibiting Activity | | | Mycobacterial Inhibiting Concentration | Fungal Inhibiting Concentration |
|  | D. Subtilis | D. Pneumoniae III | M. Pyogenes var. aureus | Mycobacterium tuberculosis H37Rv | Coccidioides immitis |
| 12-Ketooleic acid anhydride | 50 | 200 | 100 | 100 | 100 |
| 12-Ketoelaidic acid anhydride | 50 | 100 | 50 | 100 | 100 |
| 9,12-Diketostearic acid anhydride | 100 | 50 | 100 | 100 | 50 |
| 12-Keto-10,11-octadecenoic acid anhydride | 50 | 100 | 100 | 100 | 100 |

What is claimed is:

1. A process for the preparation of long-chain fatty acid anhydrides comprising the steps of reacting substantially equi-molar amounts of a long-chain fatty acid and a lower alkyl chloroformate in the presence of a substantially equi-molar amount of a lower aliphatic tertiary amine, the reaction being conducted at a temperature below about 0° C. and in the presence of an inert organic solvent, whereby an acylalkylcarbonate is formed, and adding a tertiary alkylamine salt of a long-chain fatty acid.

2. A process according to claim 1 in which the long-chain fatty acid has at least twelve carbon atoms.

References Cited in the file of this patent

UNITED STATES PATENTS

| 2,384,118 | Muskat et al. | Sept. 4, 1945 |
| 2,518,058 | Pechukas | Aug. 8, 1950 |
| 2,623,888 | Nichols | Dec. 30, 1952 |
| 2,623,889 | Nichols | Dec. 30, 1952 |

OTHER REFERENCES

Ralston: "Fatty Acids and Their Derivatives" (copyright 1948), pp. 794–803.

Emery et al.: J. Chem. Soc. (1950), pp. 1443–1460.

Vaughn Jr.: J. Am. Chem. Soc., vol. 73 (1951), p. 3547.